(12) United States Patent  
Rehker et al.

(10) Patent No.: US 8,758,881 B2
(45) Date of Patent: Jun. 24, 2014

(54) FLOOR PANEL HAVING A PRINTED CORK LAYER

(75) Inventors: Stephan Rehker, Hoxter (DE); Ansgar Wolf, Ruthen (DE)

(73) Assignee: Fritz Egger GmbH & Co. OG, Unterradlberg (AT)

( * ) Notice: Subject to any disclaimer, the term of this patent is extended or adjusted under 35 U.S.C. 154(b) by 0 days.

(21) Appl. No.: 13/702,370

(22) PCT Filed: Feb. 9, 2012

(86) PCT No.: PCT/EP2012/052211
§ 371 (c)(1),
(2), (4) Date: Feb. 13, 2013

(87) PCT Pub. No.: WO2012/113652
PCT Pub. Date: Aug. 30, 2012

(65) Prior Publication Data
US 2013/0202857 A1 Aug. 8, 2013

(30) Foreign Application Priority Data

Feb. 22, 2011 (DE) .......................... 10 2011 012 015

(51) Int. Cl.
*B32B 3/00* (2006.01)
*B32B 9/02* (2006.01)
*B32B 7/12* (2006.01)

(52) U.S. Cl.
CPC ...... *B32B 3/00* (2013.01); *B32B 9/02* (2013.01); *B32B 7/12* (2013.01)
USPC ......................................... 428/195.1; 428/201

(58) Field of Classification Search
USPC ........................................................ 428/195.1
See application file for complete search history.

(56) References Cited

FOREIGN PATENT DOCUMENTS

| DE | 19739896 C1 | 4/1999 |
| DE | 102007008062 | * 8/2008 |
| DE | 202007007768 U1 | 11/2008 |
| DE | 102007043204 A1 | 3/2009 |
| EP | 2039530 A1 | 3/2009 |

* cited by examiner

*Primary Examiner* — Elizabeth Mulvaney
(74) *Attorney, Agent, or Firm* — The Webb Law Firm

(57) ABSTRACT

A method for producing a floor panel comprising a carrier board, a cork layer, a primer and a decorative layer is disclosed. To achieve qualitatively improved decorative layers, a method is disclosed in which the cork layer is applied to the carrier board, in which, in order to form the primer, a coating system having a proportion of volatile components is applied to the cork layer, and in which the decorative layer is printed onto the primer.

15 Claims, 2 Drawing Sheets

FLOOR PANEL HAVING A PRINTED CORK LAYER

BACKGROUND OF THE INVENTION

1. Field of the Invention

The invention relates to a method for producing a floor panel with a carrier board, a cork layer, a primer and a decorative layer. The invention furthermore relates to a floor panel produced in this manner.

2. Description of the Prior Art

Cork floors, which have a carrier board made of a wood composite, are known in practice. The carrier boards are provided with known locking systems, whereby a glue-free connection of similar floor panels to form a floating floor covering is possible.

Cork floors have the property that they feel comfortable, in particular warm and soft, because of the low heat conductivity and the high resilience of the cork. On the other hand, many potential customers regard the cork surface as unsightly. Therefore, the cork layer is partly provided with a primer and this is printed with a decorative layer, so that the positive properties of the cork can be combined with a visually preferred design, for example in the form of wood surface.

However, it has been shown in practice that the decorative layer of correspondingly printed cork floors frequently does not have a satisfactory quality. Defects repeatedly occur at points in the decorative layer. The decoration is interrupted or does not have the desired appearance at the defective points.

SUMMARY OF THE INVENTION

The technical problem on which the invention is based therefore consists in disclosing a method for producing a floor panel of the type mentioned at the outset and described in more detail above as well as a correspondingly produced floor panel, which allow qualitatively improved decorative layers.

In this case, a coating system is taken to mean the material or the material mixture as applied to the cork layer. During the drying or curing of the coating system, any volatile components present escape. The remaining primer is then a called coating or coating layer. In addition, it is assumed that the primer is applied directly to the cork layer to save further working steps or additional material. However, it is conceivable for at least one further layer to also be provided between the primer and the cork layer. It is likewise conceivable for a further layer to be provided between the cork layer and the carrier board. This may be an adhesive layer for gluing on the cork layer and/or another layer.

The invention has recognised that defects in the decorative quality occur primarily where there are so-called defective points in the cork surface. Because of previous processing steps, small cork particles are missing in the surface as these defective points. Therefore, the cork surface has indentations as these defective points. Conventional coating systems to form primers on cork surfaces of floor panels fill up these indentations in the cork surface and form a uniform surface film.

During the subsequent curing of the coating, for example drying of the coating system, the volatile components contained therein escape. As a result, the layer thickness reduces accordingly. In the region of indentations, where the coating system has a correspondingly higher layer thickness the layer thickness reduces more, viewed absolutely, during drying than in the regions without defective points. Therefore, dents remain after the drying of the coating system in the surface of the primer thus being produced, specifically in the regions of indentations or defective points in the cork surface. These dents may be comparatively deep, as conventional coating systems have a substantially volatile solvent fraction in the order of magnitude of 40% by volume to 65% by volume.

It was also established that no, or only an inadequate, decorative layer is often printed onto the primer above the dents. The printing of the decoration takes place by means of a printing device, which is guided over the surface and may be configured in the form of a printing cylinder. In the region of the dents, the printing device may lose contact with the primer, so no, or only an inadequate, decorative layer is applied there. This does not only have visual drawbacks, but makes the dents deeper, so the application of further surface layers is further impaired.

Furthermore, it has been shown that the dents occurring when applying the primer can also not be removed, or only inadequately, by a subsequent sanding of the primer, which is sometimes also called a sanding base, adhesion base or primer layer. Insufficient material is removed to obtain a primer without dents in the surface by the sanding typically carried out to smooth the primer.

A relatively long sanding with more material removal is only conditionally suitable as such to produce a dent-free surface of the primer. As the mean layer thickness of the primer is very thin, the tolerable material removal during sanding is also limited.

As a result, the invention has led to the surprising recognition that the occurrence of dents in the decorative layer can be avoided or at least significantly reduced by using so-called high-solid coating systems to form the base. High-solid coating systems in the sense of the invention have a volatile component fraction, in particular solvent fraction, of a maximum of 10% by volume. Accordingly, the high-solid coatings are preferably distinguished by a maximum volume reduction of 10% by volume.

This quite basically means that the relative decrease in the layer thickness during curing and/or drying of the coating system is comparatively small, which is why the absolute difference in the decrease in the layer thickness between the region with indentations in the cork layer and regions without such indentations is also very small during the curing and/or drying. The dents remaining in the primer therefore have, if at all, only a very small depth which does not impair the application of further layers to the primer.

According to the traditional understanding, solvent fractions of the coating system may remain in the coating as an unevaporated residue or as being chemically bound in the primer during the complete reaction of the coating system, even if the solvent is volatile per se. In other words, the volatile components of the coating system may be the solvent fraction thereof. However, this is not necessary, as the solvent may have still further non-volatile components or not be expelled during the curing of the coating system. Thus, the volatile components are taken to mean those components which, during the drying or curing of the coating system, are expelled therefrom. Furthermore, because of the preferred process conditions during the production of floor panels, volatile components are preferably taken to mean those which evaporate under standard conditions (1 atm; 25° C.), in particular, however, at 1 atm and 40° C. to 50° C.

The complete reaction of solvent components, for example by crosslinking, like the escape of volatile solvent components, can contribute to a decrease in the volume of the coating system. The greater the volume decrease owing to the complete reaction or crosslinking of solvent components of a coating system, the lower, as a rule, the fraction of volatile components in the coating system should be, so that the volume decrease as a whole does not exceed a critical value with regard to the dent formation.

The coating system, if necessary, also manages completely without a volatile component, as long as the coating system is nevertheless a fluid coating system. A fluid coating system is, completely in general, taken to mean a flowable coating system. The viscosity of the coating system is therefore large enough to give the coating system a fluid, in any case, pasty, character. A fluid coating system of this type means that the coating system can penetrate into the indentations of the cork surface in order to fill up the indentations accordingly. Powder coating systems, which consist exclusively of solid materials, are not to be regarded as fluid coating systems. Powder coating systems, are also unsuitable for filling up the indentations in the cork layer and therefore ensuring a level, dent-free surface of the primer. A fluid coating system in the sense of the invention thus ultimately has at least one liquid component. This liquid component is preferably a solvent component. It may, for example, chemically react or be expelled during curing.

In a first preferred configuration of the method, to form the primer, a coating system with a fraction of volatile components of a maximum of 5% by volume is applied. The tendency to form dents in the surface of the primer is thus further reduced. However, at the same time, a coating system that is adequately uniform in many cases can also be applied. In this context, it is further preferred if the coating system has a fraction of volatile components of a maximum of 3% by volume. With a suitable method process, on the one hand, a uniform application of coating can thus be achieved and, on the other hand, the development of dents can be more or less completely prevented. Alternatively or additionally, the coating system, to form the primer, may have a fraction of volatile components of a maximum of 10% by weight, preferably a maximum of 5% by weight, in particular a maximum of 3% by weight. This applies, for example, when, because of relatively high density differences in the components of the coating system, apart from the volume of the fraction of volatile components, its weight fraction is to be accordingly adjusted, in order to ensure a uniform application of the coating system.

Because of the low fraction of volatile components, a radiation-curing coating system may be used to form the primer. In these coating systems, at least one solvent component crosslinks with another component of the coating system during curing under the action of radiation. This solvent component, therefore does not, or only to a significantly reduced extent, have to be expelled by drying. These coating systems, because of a higher fraction of liquid components, may provide an adequately low viscosity for the uniform application of the coating system. The use of a UV-curing coating system is recommended here because of the simplified handling and method process. The curing of the coating system preferably takes here directly after the application of the coating system, as subsequently applied layers can impair the penetration of the radiation into the coating system for the uniform curing thereof.

Independently of the curing of the coating system, an acrylic resin coating system may preferably be used to form the primer. Corresponding coating systems can be processed well and form a primer with preferred physical properties. This applies, in particular, when the coating system has at least one polyacrylate and/or at least one polymethacrylate.

So that the drying and/or the curing of the coating system can be accelerated to form the primer, the cork layer may be heated before the coating system is applied to a temperature of between 40° C. and 60° C. Basically, higher temperatures are preferred here but too high a temperature can make cork cells in the cork layer expand, which is to be avoided because of the formation of further irregularities. Therefore, it has proven to be particularly expedient to heat the cork layer to about 50° C.

The coating system to form the primer is preferably applied to the cork layer using a roller application machine. This preferably has an application roller, which applies a certain quantity of the coating system to the cork layer. The application roller rotates here in the transporting direction of the still unfinished floor panel. The application roller may cooperate with a metering roller and form a gap, above which the coating system is available and is entrained in accordance with the roller gap by the application roller. A smoothing roller rotating counter to the transporting direction may be provided in the transporting direction after the application roller and forms a defined gap with the cork layer, which fixes the layer thickness of the coating system. The smoothing roller may be chrome-plated or have an outer layer of hard metal or ceramic, so that as level a surface as possible of the coating system film can form. The coating system is uniformly brought into the indentations in the cork surface by the direction of rotation of the smoothing roller and/or the application of the coating system by the application roller. The application of the coating system can also take place in a different manner. The application of the coating system may, also take place in a different manner. However, a width-adjustable gap should be provided in order to be able to produce a primer with a defined and uniform layer thickness.

The transportation of the still unfinished floor panel through the roller application machine, can be brought about by at least one conveyor belt, a counter-pressure roller being able to be provided below the application roller and/or the smoothing roller, said counter-pressure roller forming, with the other roller, a roller gap of a defined width. The at least one counter-pressure roller may be rubberised and/or driven. If necessary, the at least one counter-pressure roller is also the drive roller for the conveyor belt.

In order to smooth the primer after application to the cork layer and/or to improve the adhesion of a further layer to the primer, the primer may be sanded after application. If necessary, this may also take place in a plurality of steps with different grain sizes.

The application of a decoration may be simplified in that a base colour is firstly applied to the primer. The base colour is preferably rolled onto the primer by means of a suitable application roller. A printing device may also be used here to apply the base colour, the base colour, however, unlike when printing a decorative layer, being applied over the whole area instead of in the form of a pattern. By applying the base colour, the decoration is not impaired by the colour of the primer. The base colour may also correspond to a base colour of the decoration and thus form part of the later visible decoration. The layer of the base colour may thus be regarded as a part layer of the decorative layer. However, a coating system having corresponding colour pigments may also be used to form the primer, so the primer already has the desired base colour. The base colour is preferably applied by means of a roller, in particular by means of a printing mechanism.

A decorative layer is printed onto the base colour or alternatively onto the primer, and this preferably takes place by means of printing rollers. In this case, the gravure printing method is recommended, in particular. To achieve as pleasing a decoration as possible, a multi-colour printing mechanism is preferably used to apply the decorative layer in a plurality of work operations. In each work operation, a different colour of the decoration is applied. The decoration could, however, also be applied in a different manner, for example by digital printing.

So that the decorative layer can be permanently provided with a seal for protection against abrasion, it is recommended that an adhesion promoter is applied to the decorative layer. The sealing layer may, however, basically also be applied to the decorative layer without an adhesion promoter, for example in order to achieve a saving of material. Depending on the desired sealing of the decorative layer and the later loading of the floor panel, the seal may be multi-layer and be applied in a plurality of work operations.

The cork layer used may be one with a density of at least 550 kg/m$^3$. In this case, a higher compaction of the cork leads to less and/or less pronounced surface indentations in the cork layer (defective points). Furthermore, it may therefore be preferred if the density of the cork layer is at least 650 kg/m$^3$. However, with the rise in the density, the resilience of the cork layer may also be impaired, which should be taken into account in selecting the cork material.

Alternatively or additionally, indentations in the cork layer may be limited by the layer thickness itself. For this purpose, for example, a cork layer with a layer thickness of less than 2 mm may be used. If this impairs the resilience or the insulating effect of the cork, the cork layer may also have a thickness of less than 1.5 mm.

In order to compensate stresses in the floor panel, it is recommended that a so-called backing layer be provided on the rear of the carrier board. This is preferably also formed from a cork layer. Particularly good stress compensation is obtained here if the cork layers consist of the same material on both sides of the carrier board and/or have the same layer thickness. If necessary, a backing layer in the form of a cork layer may be provided, which resembles the cork layer to be provided with the primer. However, a different cork layer or another material can be used as the backing layer if material costs, for example, are thereby saved.

The technical problem mentioned at the outset is also achieved by a floor panel with a carrier board, a cork layer, a primer and a decorative layer, which has been produced according to any one of claims 1 to 14.

Furthermore, the carrier board may be provided at the peripheral narrow side with locking systems known per se. Respective opposing narrow sides in this case preferably have locking systems corresponding to one another, in order to in each case, be able to assemble and lock the same type of floor panels to form a floor covering.

The carrier board is preferably formed from wood or a wood composite. Corresponding carrier boards are economical to produce and have favourable mechanical properties. Moreover, corresponding carrier boards can easily be recycled. The use of a medium-density fibre board (MDF) or a high-density fibre board (HDF) is recommended to attach locking systems for glue-free connection of the panels on the narrow sides. More economical floor panels may be manufactured with carrier boards configured as chipboards. Basically, however, carrier boards in the form of oriented-stand boards (OSB) and, in particular because of their moisture-resistance, carrier boards configured as a WPC board (wood-plastic compound) or compact laminate are also possible.

Good compromises between the mechanical strength and the thickness of the floor panels are produced for carrier boards with a thickness between 2 mm and 8 mm. Carrier boards with a thickness of between 3.5 mm and 6 mm have proven to be particularly expedient in this context.

BRIEF DESCRIPTION OF THE DRAWINGS

The invention will be described in more detail below with the aid of drawings showing only embodiments. In the drawings.

DETAILED DESCRIPTION OF THE INVENTION

Figure 1:
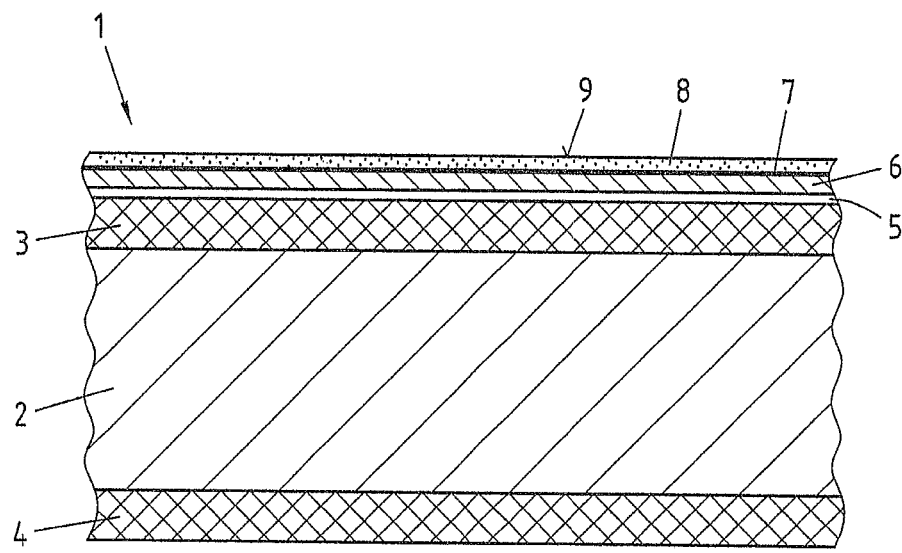
FIG. 1 shows the layer structure of a floor panel according to the invention, in a schematic view.

FIG. 1 shows a floor panel 1 in a vertical section, the view being schematic inasmuch as the view of locking elements to lock the floor panel to similar types of floor panels to form a floor covering has been omitted at the narrow sides. Moreover, the individual layers of the floor panel are not reproduced to scale. Rather, in particular the upper layers are shown enlarged for better clarity. In addition, it is not shown that the floor panel has a rectangular form.

The floor panel 1 has a carrier board 2 in the form of a high-density fibre board (HDF), on which a cork layer 3 has been glued by means of a two-pack adhesive. A further cork layer 4, which acts as a so-called backing layer for the floor panel 1, is also glued to the lower side of the carrier board 2 by means of a two-pack adhesive. The cork layers 3, 4 have a density between 550 kg/m$^3$ and 600 kg/m$^3$. The thickness of the upper cork layer 3 is between 1 mm and 2 mm. The cork layer 4 of the backing layer, on the other hand, is about 1 mm thick. The thickness of the carrier board 2 arranged between the cork layers 3, 4 is about 3.5 mm to 4.5 mm.

A primer 5, which fills up indentations in the cork surface and itself forms a smooth and level surface for printing with a decorative layer 6, is applied to the upper side of the upper cork layer 3. In the floor panel shown and to this extent preferred, a colour layer 6 in the form of a base colour matched to the decoration is applied to the primer 5, said base colour forming a lower part layer of the decorative layer 6. The base colour is provided over the whole area without any colour shadings. The colour matching of the base colour and decoration is such that the base colour forms a colour shade of the decoration and therefore is itself a component of the visible decoration.

Various patterns in different colours are consecutively printed on the base colour layer. The layers then together form the decorative layer 6. The respective patterns are applied by means of corresponding printing rollers by the gravure printing method. The decoration is reminiscent of a wood surface in the floor panel 1 shown and to this extent preferred. However, the decoration could also be reminiscent of other surfaces or configured as a fantasy decoration.

An adhesion promoter layer 7, on which the sealing layer 8 arranged thereon adheres well and is to protect the decoration from abrasion, is provided on the decorative layer 6. The sealing layer 8 is applied in a plurality of part layers in the floor panel 1 shown, of which part layers, at least one part layer has abrasion-resistant particles, such as, for example, corundum particles.

Furthermore, the sealing layer 8 has a structuring 9, which gives the surface of the floor panel 1 a three-dimensional appearance. The structuring 9 may, for example, be achieved by an embossing (mechanical pore), by variable crosslinking (chemical pore) or a printing process (printed or coating pore).

Figure 2:
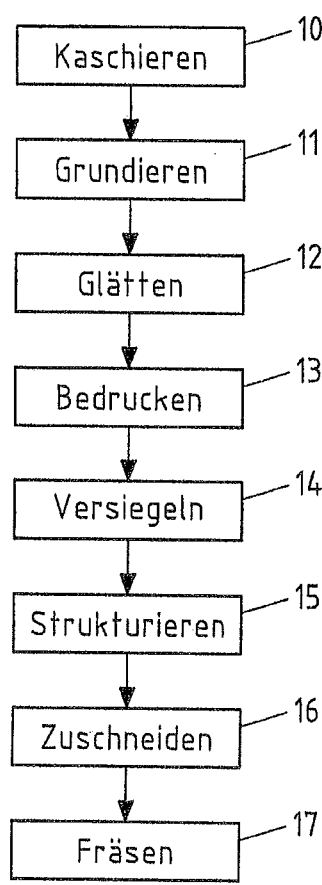
FIG. 2 shows the sequence of a method according to the invention in a flow chart and FIG. 3 shows a roller application machine used in the method according to FIG. 2.

FIG. 2 schematically reproduces the important method steps when producing the floor panel 1 shown in FIG. 1. Carrier panels are firstly provided, from which a plurality of floor panels are later machined. The carrier panels are then laminated 10 with cork layers on both sides by means of a two-pack adhesive in a double belt press.

A coating system to form a primer is then applied 11 to the upper cork layer. The coating system used has a fraction of volatile components of less than 3% by volume. If necessary, before the application of the coating system, the layer composite of the carrier board and cork layers is heated on the surface or overall to a temperature of about 50° C. By raising the temperature, the time for curing the coating system is shortened. In order to expel volatile components of the coating system, the coating system is dried in a drying channel. Preferably in parallel with this, the coating system is subjected to a UV-radiation, in order to activate photo initiators and bring about a chemical curing (crosslinking) of the coating system. As the primer is also printed with colour layers absorbing UV-radiation, the primer is already cured completely in this method stage.

The cork layer on the later lower side of the carrier board is used as a so-called backing layer. This is not printed and therefore does not need to be primed, either.

The cured primer is sanded in a subsequent step 12, in order to smooth the surface further and to improve the adhesion of further layers on the primer. In the method shown and to this extent preferred, the primer is sanded by means of a wide band sanding machine in two stages with grain sizes of 320 and then 400.

A decorative layer is applied 13 to the surface of the primer prepared in this manner. In this case, a water-based base colour is firstly applied. The quantity of base colour in the method described is about 60 g/m$^2$ (wet), the solid body fraction of the base colour being about 50 to 65% by weight. The colour shade is adapted to the colour shade of the decoration. The base colour may, if necessary, be applied in a plurality of steps wet-on-wet or with intermediate drying. The base colour is applied with an application roller, with which the base colour is applied in a defined layer thickness. The application roller then transfers the base colour to the primer guided along the application roller and applied to the cork layer. The defined layer thickness can be adjusted by means of a metering roller, which, with the application roller, forms a gap of a predetermined width, base colour being kept ready in a sufficient quantity above the gap and between the rollers.

The base colour is dried in a drying channel by means of hot air between the application of the base colour and the further decorative layers. Various decorative elements are then printed on consecutively in various colour shades by the gravure printing method known per se. Alternatively or additionally, digital printing techniques may also be used to print on the decoration. The individual decorative part layers are dried individually or together after the application for the purpose of curing by means of hot air.

An adhesion promoter is applied in the next step to the decorative layer and dried by means of a UV-radiator. The adhesion promoter ensures permanent adhesion of a sealing layer still to be applied despite the resilience of the cork layer.

The sealing layer is preferably applied 14 in a plurality of steps. In the method presently described, each part layer has hard particles of a different particle size. The particle size decreases toward the upper side. In the lower layers, the particle sizes are, for example, 60 to 200 μm, while particles close to the surface have a size of, for example, 5 to 20 μm. An intermediate curing takes place in each case, so the individual layers of the sealing layer are firstly, but only slightly, solidified, which is also called gelling.

In the method described, a further coating layer of a transparent coating system is also applied for optical reasons. The application does not, however, take place over the entire surface, so a structuring 15 of the surface is obtained. The structuring is optically reinforced by degree differences of shine between the surface coating layer and the sealing layer. In this context, a coating pore is also referred to. Finally, the surface coating layer and the sealing layer are cured together by means of UV-radiation.

A cutting to size 16 then takes place, in which individual floor panels are machined out of the large composite panels processed as described. These are then provided with locking profiles at the narrow sides by milling 17.

Figure 3:
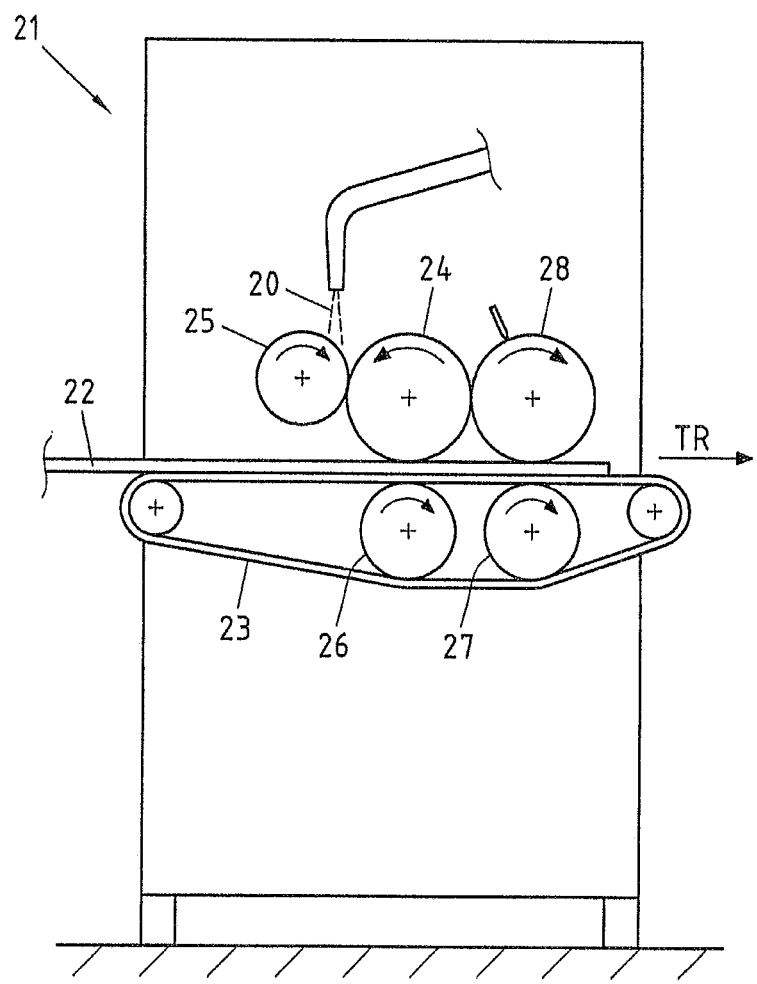

As shown in FIG. 3, the coating system 20 is applied to the cork layer by means of a roller application machine 21. The carrier boards 22 with the two cork layers are transported by a conveyor belt system 23 in the transporting direction TR through the roller application machine 21. The coating system 20 is placed above a gap between an application roller 24 and a metering roller 25. From there, depending on the roller gap between the application roller 24 and the metering roller 25, a corresponding quantity of the coating system 20 is transported away by the application roller 24 and then transferred to the cork layer. The direction of rotation of the metering roller 25 can be in the opposite direction to, or in the same direction as, the application roller. In the latter case, a doctor blade is required to prevent the coating system 20 being driven in a circle on the metering roller 25.

A rubberised counter-pressure roller 26 is provided below the application roller 24, by means of which counter-pressure roller the roller gap, and therefore the spacing between the application roller 24 and cork layer, can be adjusted. A further roller pair follows in the transporting direction TR, of which the lower roller is in turn a counter-pressure roller 27 to adjust the roller gap, and therefore the spacing, of the upper smoothing roller 28 from the associated cork layer. The smoothing roller 28 is chrome-plated and extremely level and smooth. Furthermore, the smoothing roller 28 is rotated counter to the transporting direction TR so that the smoothing roller 28 retains a part of the applied coating system 20 in the form of a bead. Excess fractions of the coating system 20 are, in the process, returned from the smoothing roller 28 to the application roller 24 and/or direct therefrom back into the intermediate space between the metering roller 25 and the application roller 24. The smoothing roller 28 therefore reliably fills up the indentations in the cork surface with the coating system 20 and lets through the film of the coating system 20 with a precisely predetermined film thickness.

The invention claimed is:

1. A method for producing a floor panel with a carrier board, a cork layer, a primer and a decorative layer,
   wherein the cork layer is applied to the carrier board,
   wherein, to form the primer, a fluid coating system with a volatile component fraction of a maximum of 10% by volume is applied to the cork layer and
   wherein the decorative layer is printed on, rolled on, or printed on and rolled on the primer.

2. The method according to claim 1, wherein, to form the primer, a coating system with a volatile component fraction of a maximum of 5% by volume is applied to the cork layer.

3. The method according to claim 1, wherein, to form the primer, a radiation-curing coating system is applied to the cork layer.

4. The method according to claim 1, wherein, to form the primer, an acrylic resin coating system is applied to the cork layer.

5. The method according to claim 1, wherein the cork layer is heated to a temperature between 40° C. and 60° C. before the application of the coating system to form the primer.

6. The method according to claim 1, wherein the coating system, to form the primer, is applied with a roller application machine.

7. The method according to claim 1, wherein the surface of the coating system, to form the primer, is smoothed by means of a smoothing roller after application.

8. The method according to claim 1, wherein the primer is sanded after application to the cork layer.

9. The method according to claim 1, wherein a base colour is applied to the primer.

10. The method according to claim 1, wherein the decorative layer is printed on the primer or on the base colour.

11. The method according to claim 1, wherein an adhesion promoter layer is applied to the decorative layer.

12. The method according to claim 1, wherein a sealing layer is applied to the adhesion promoter layer or the decorative layer.

13. The method according to claim 1, wherein a cork layer with a density of at least 550 kg/m$^3$ is applied to the carrier board.

14. The method according to claim 1, wherein a cork layer with a thickness of less than 2 mm is applied to the carrier board.

15. A floor panel with a carrier board, a cork layer, a primer and a decorative layer, wherein the floor panel is produced according to claim 1.

\* \* \* \* \*